US008417604B2

(12) United States Patent
Orr et al.

(10) Patent No.: US 8,417,604 B2
(45) Date of Patent: Apr. 9, 2013

(54) PERSONAL DATA AGGREGATION, INTEGRATION AND ACCESS

(75) Inventors: David Anthony Orr, Cornelius, NC (US); Kim Leah Bunn, St. Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 215 days.

(21) Appl. No.: 12/841,263

(22) Filed: Jul. 22, 2010

(65) Prior Publication Data

US 2012/0022987 A1 Jan. 26, 2012

(51) Int. Cl.
*G06Q 40/00* (2012.01)

(52) U.S. Cl.
USPC ............................................................ 705/35

(58) Field of Classification Search ..................... 705/35, 705/37, 41
See application file for complete search history.

(56) References Cited

U.S. PATENT DOCUMENTS

| 5,590,038 | A * | 12/1996 | Pitroda ............................ 705/41 |
| 8,069,053 | B2 * | 11/2011 | Gervais et al. .................. 705/1.1 |
| 8,127,986 | B1 * | 3/2012 | Taylor et al. ................... 235/380 |
| 8,132,715 | B2 * | 3/2012 | Barcelou ........................ 235/379 |
| 8,185,940 | B2 * | 5/2012 | Bowers et al. ..................... 726/8 |
| 2004/0141604 | A1 * | 7/2004 | Shaffer et al. ............ 379/201.02 |
| 2007/0118479 | A1 * | 5/2007 | Halsema et al. ................. 705/51 |
| 2011/0218912 | A1 * | 9/2011 | Shivers et al. .................. 705/42 |
| 2011/0251888 | A1 * | 10/2011 | Faith et al. ................. 705/14.43 |
| 2011/0320355 | A1 * | 12/2011 | Pasha et al. ..................... 705/44 |

* cited by examiner

*Primary Examiner* — Jagdish Patel
(74) *Attorney, Agent, or Firm* — Banner & Witcoff, Ltd.; Michael A. Springs (57) ABSTRACT

A data storage archive is provided for storing personal information and other data from a variety of disparate information sources. The information stored may be later electronically accessed and retrieved by users without requiring the users to carry physical documentation having the information stored thereon. The information may be stored in association with a user's financial account at a financial institution. For example, the information may be indexed or stored in an account identified by the user's financial account number or other financial identifier. In some arrangements, accessing the personal information may include a validation process using a security device separate from a device through which a user is attempting to access the information. Personal information may also be shared among financial account holders based on legal and financial relationships known to the financial institution. A user may also manually assign access privileges to other users.

20 Claims, 6 Drawing Sheets

PERSONAL DATA AGGREGATION, INTEGRATION AND ACCESS

BACKGROUND

An individual may, over the course of his or her life, accumulate and make use of a variety of personal and private information. For example, in order to access health benefits, an individual may be required to provide health insurance identification information. In another example, individuals may need to retrieve purchase receipts to file tax returns at the end of the year. Oftentimes, individuals may maintain such information in physical form such as with insurance cards or papers, paper receipts and the like. Furthermore, in many instances, individuals will store such information in a readily accessible location such as a wallet, a purse or other portable storage unit. However, as with many portable (and non-portable) physical items, a risk of loss may exist and organization of the items may be difficult.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a financial institution may provide an information storage archive that is configured to collect, integrate and store financial and non-financial information. For example, the information collected may include insurance information (car, medical, home, and the like), utility bills/account information, employment data, tax information, receipts, personal records (e.g., education transcripts, criminal records, driving records) and the like. Accordingly, the user may be able to retrieve a variety of personal information without having to carry physical documentation for each piece of information that may be needed. The archive may collect information based on parameters provided by a user. For example, a user may specify the information source, security credentials, collection schedule and the like. In some arrangements, electronic images of the would-be physical documentation may be stored in the archive and made electronically accessible.

According to another aspect, personal information retrieval might only be authorized in response to determining that a user is validated by a security device. The security device may be different from a device through which the information is being requested and may provide an added level of validation than login credentials or credentials provided by the requesting device. For example, the security device may provide a periodically changing security code. In another example, the location of the security device may provide validation.

According to yet another aspect, personal information may be accessible by multiple users depending on the privileges defined by the user to which the personal information belongs. In some arrangements, access privileges may be automatically provided depending on a legal relationship or account relationship between two individuals. For example, a parent might automatically be authorized to access personal information stored in association with a minor's financial account. In another example, two individuals having linked checking accounts might automatically be authorized to access personalized information for each other. Different levels of access privileges may be defined depending on the type of relationship (e.g., financial account relationship, legal relationship (such as marriage)).

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
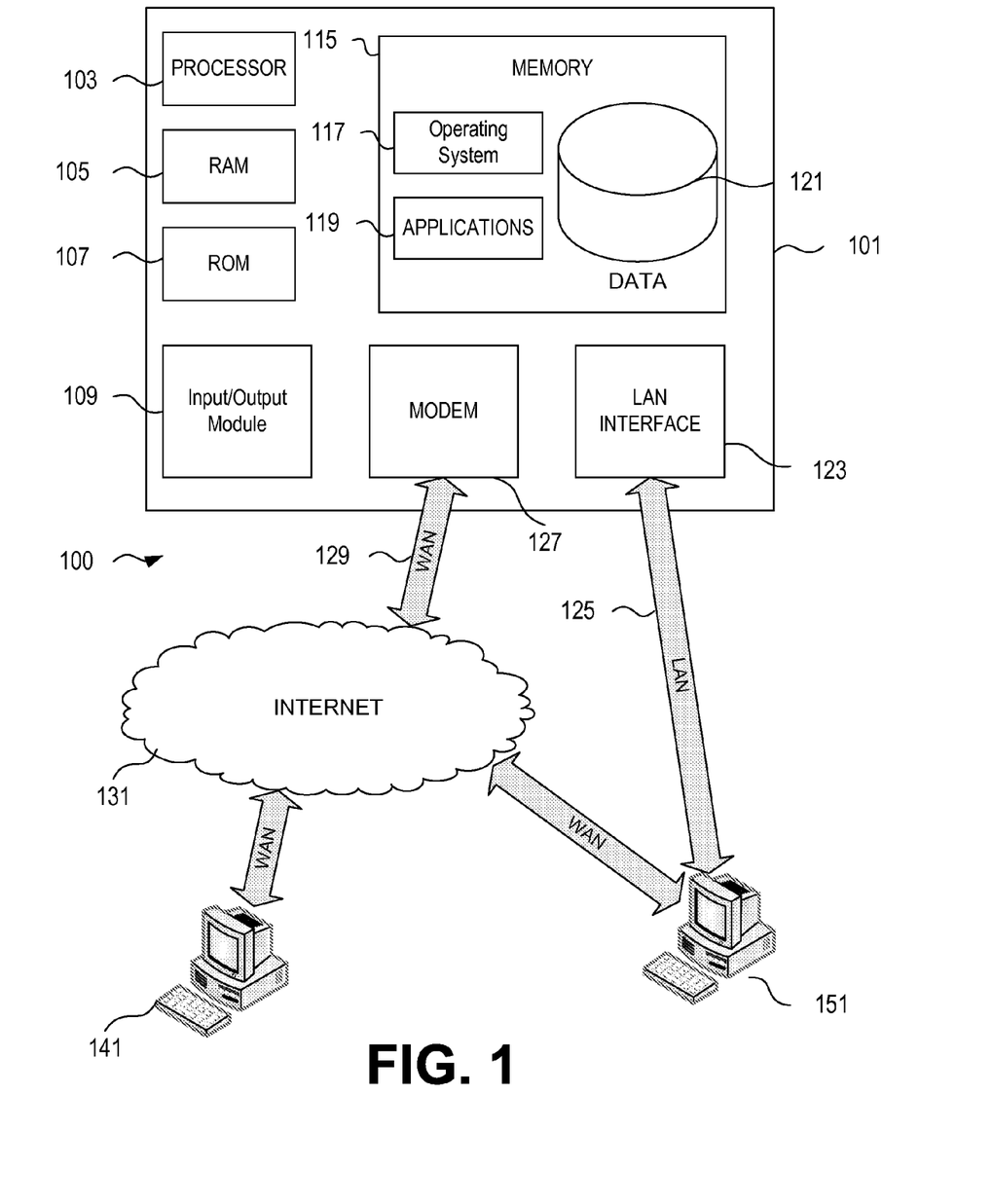
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
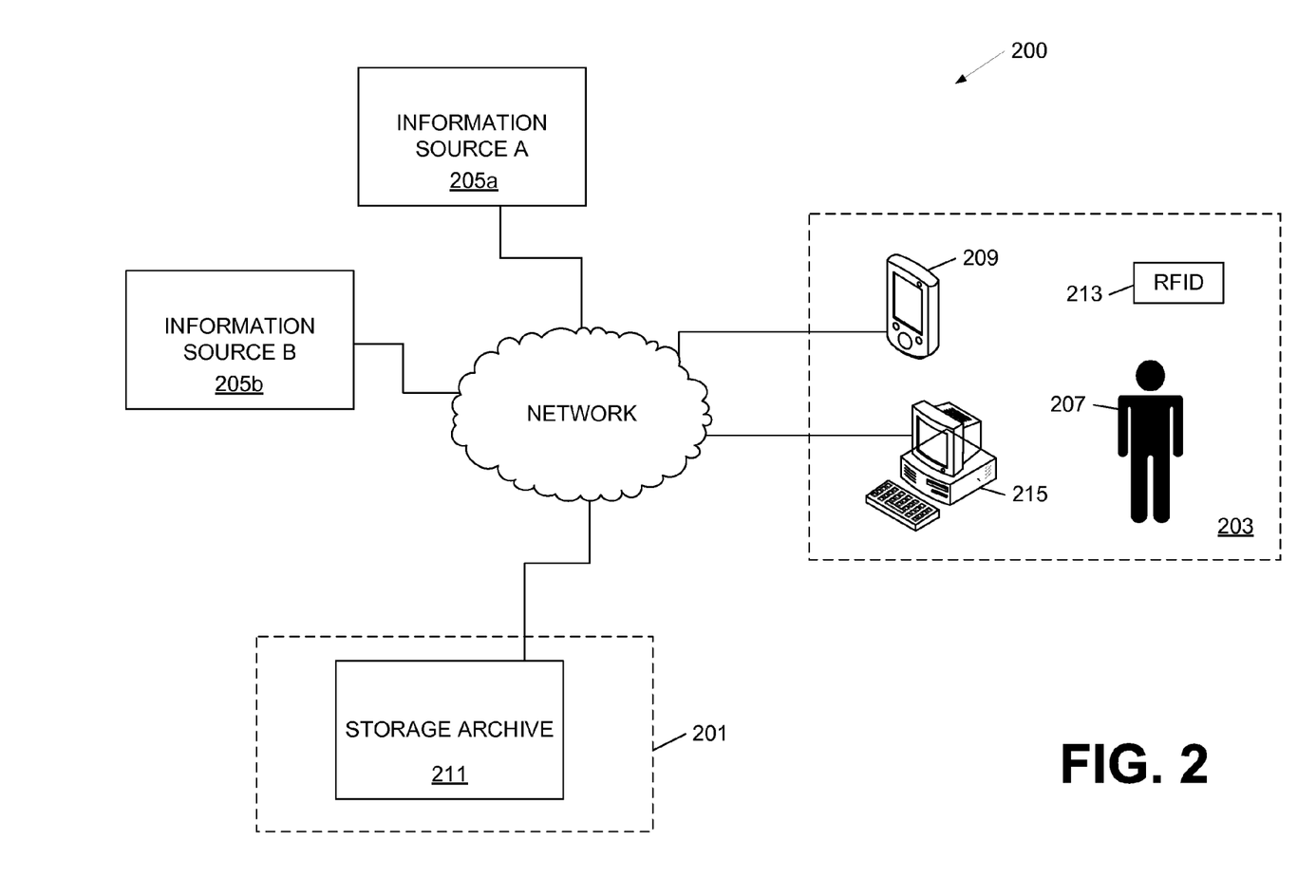
FIG. 2 illustrates an example network environment for retrieving personal information from a variety of information sources and processing information requests according to one or more aspects described herein.

FIG. 2 illustrates an example network operating environment for an information archiving system. Operating environment 200 encompasses multiple systems and locations including a financial institution 201, a customer location 203 and information sources 205*a* and 205*b*. Information sources 205*a* and 205*b* may correspond to a retail store, an insurance provider, a school, a warranty company, a local, state or national government and the like. Operating environment 200 allows a user such as customer 207 to organize and access personal information from information sources 205*a* and 205*b* with reduced risk of loss and physical encumbrance. For example, customer 207 may arrange for financial institution 201 to collect and archive personal information from each of the information sources 205*a* and 205*b*. Then, using customer device 203 or 215, customer 207 may access the personal information electronically without having to transport physical documentation providing such data. In one example, customer 207 may access insurance information such as insurance provider names, identifiers, phone numbers, customer account identifiers and the like through financial institution 201 using device 209 or device 215 rather than having to carry a physical insurance card. In another example, customer 207 may further retrieve digital receipt information from financial institution 201 when preparing a tax return using device 209 or device 215 rather than having to filter through physical receipts. In some arrangements, the data may include an electronic image of a physical document on which the information is printed. Device 209 may comprise any number of mobile devices such as laptop computers, personal data assistants (PDAs), mobile telecommunication devices (e.g., cell phones, smartphones), portable tablet computers and the like. Device 215, on the other hand, may comprise stationary or fixed devices such as desktop computers, workstations, televisions and the like.

Financial institution 201 includes a digital information archive 211 that is configured to harvest customer specified information from information sources 205*a* and 205*b*. Collection of personal information from sources 205*a* and 205*b* may be a one-time occurrence or may be a repeating process that follows a specified schedule. For example, customer 207 may define a preferred collection schedule (e.g., once a day at a certain time, once a week, once a month, and the like). In another example, if customer 207 has not defined a schedule, archive 211 may institute a default schedule such as twice a week on Tuesdays and Fridays at midnight. Various other digital information collection schedules may be defined. Customer 207 may also define different collection schedules for different information sources 205*a* and 205*b*, for different times of year, once a year during (e.g., before tax returns are due), different individuals to which the personal information applies (e.g., once a week retrieval for personal information of the parent and twice a week retrieval for personal information of a child).

In the illustrative embodiment, digital information archive 211 is equipped with a variety of security protocols in order to securely communicate with information sources 205*a* and 205*b* as well as personal authentication information for accessing the personal information requested. Thus, customer 207 may be required or requested to enter their authentication information such as a login ID and a password for each of the information sources (e.g., sources 205*a* and 205*b*) from which personal information is to be collected. In other arrangements, the personal information may be pushed or sent by information sources 205*a* and 205*b* rather than retrieved by digital information archive 211. Thus, digital information archive 211 might not need to store authentication information, although it may still be equipped with secure communication protocols to protect against snoopers and other illegitimate entities attempting to obtain the information during transport.

To facilitate access of the personal information from a variety of locations, device 209, as described above, may generally be provided as a portable system that may be easily transported by an individual. Alternatively, a user may operate a stationary device such as 215 to access the information. In one example, a user may use a public computing system (e.g., at a medical office or in a library) to retrieve data. As with archive 211, devices 209 and 215 are equipped with various secure communication protocols to avoid improper access of personal information being transmitted to and from archive 211. In one arrangement, devices 209 and 215 are equipped with an application that is configured to communicate specifically with archive 211. For example, the application may be a smartphone application or PC application that provides customized user interfaces for mobile handheld devices. Devices 209 and 215 are further capable of communication through a network with information sources 205*a* and 205*b*, allowing customer 207 to access personal information through information sources 205*a* and 205*b* and/or to configure information transmission and/or retrieval privileges. In one example, customer 207 may specify to information sources 205a and 205b, the entities that are permitted to retrieve data therefrom.

In some configurations, archive 211 stores personal information in association with a financial account identifier of a financial account of customer 207 and held by financial institution 201. Archive 211 may organize the personal information by information type, information source, date, access/viewing frequency and/or combinations thereof. Personal information stored in association with a financial account identifier may comprise personal information for multiple individuals. For example, a parent may be allowed to retrieve and store personal information for his or her (minor) children. In other examples, an individual may be allowed to retrieve and store personal information for another individual (such as a person for whom they hold power of attorney) so long as permission has been granted by the other individual. Personal information associated with one financial account and one individual might also be accessible to a second individual associated with another financial account if the two financial accounts are related (e.g., one is a subsidiary account of the other—in such a case only the primary account holder may be able to access both sets of personal information and financial accounts).

To provide added security, customer 207 may be provided with a validation device such as RFID tag 213. Validation devices may comprise a wide range of technologies that are capable of short-range and/or long-range wireless communications. For example, devices may be validated using communication technologies such as infrared, near field communication (NFC), Wi-Fi, wireless wide area networks (WAN), local area networks (LAN), and/or BLUETOOTH. In arrangements where a validation device is used or required, financial institution 201 may verify that RFID tag 213 or some other validation device exists within a predefined proximity of the information requesting device (e.g., device 209). In other instances, a validation device such as RFID tag 213 may require user input to verify that the requesting device 209 is allowed to receive the requested personal information. In yet other arrangements, RFID tag 213 or other validation device may provide a security code that periodically or aperiodically changes and that must be entered into one or more requesting devices such as devices 209 and 215 and provided to the financial institution 201 before the information will be released to devices 209 and/or 215. Various security measures may be implemented using a two device or multi-device (e.g., three, four, five, ten device) model.

Figure 3:
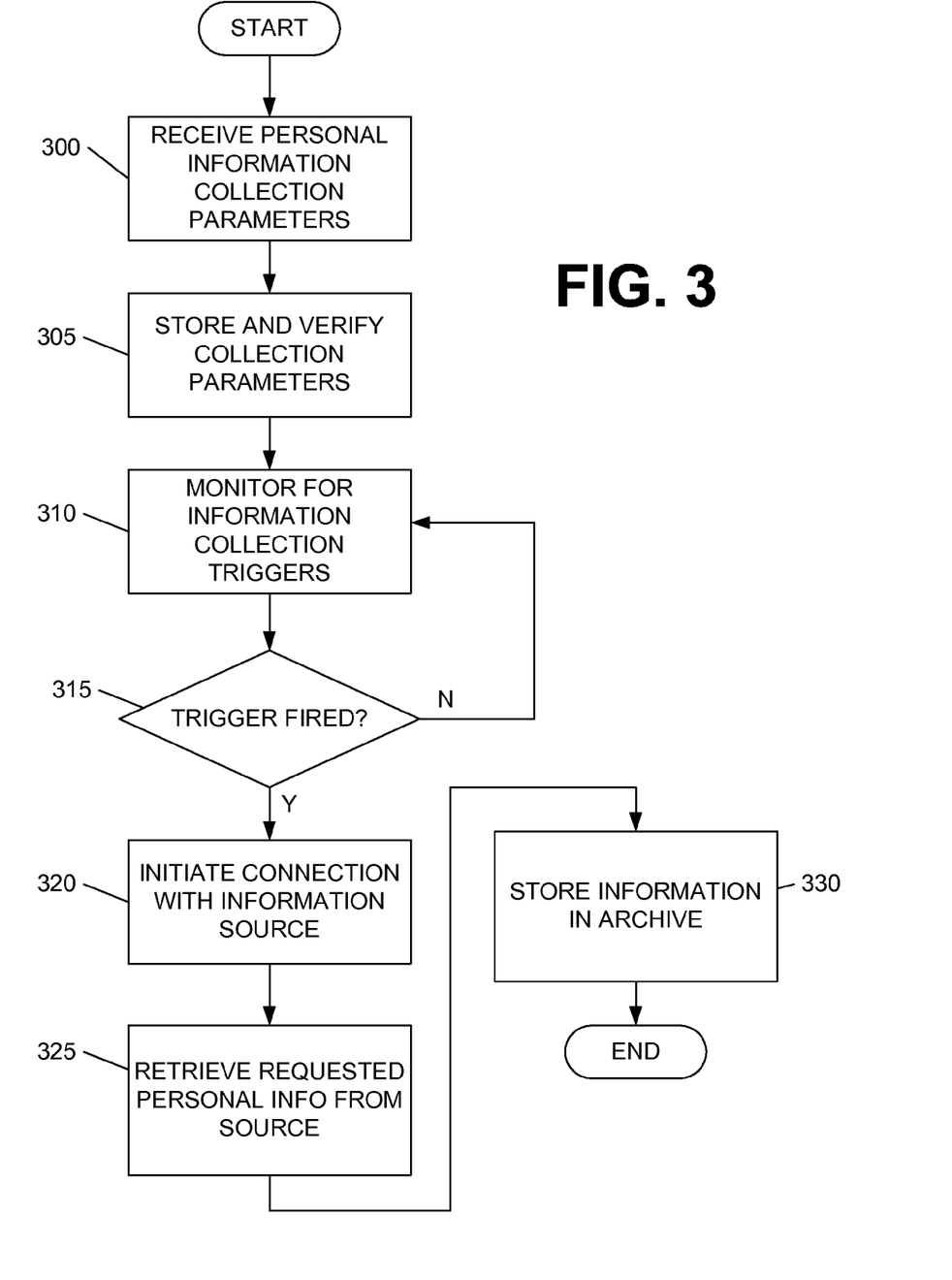
FIG. 3 is a flowchart illustrating a method by which a data storage archive may harvest personal information from a variety of information sources for a user according to one or more aspects described herein.

FIG. 3 is a flowchart illustrating a method by which a financial institution system collects personal information and stores the personal information in an archive. In step 300, for example, a financial institution system (e.g., a server or other computing device) initially receives personal information collection parameters from a financial account holding customer including identification of information sources, particular types of information to collect and a frequency with which the information is to be collected. The financial institution system may receive or request other types of collection parameters including a type of security to be used, login/password information, whether the information is to be retrieved or will be pushed from the information source, a priority level of the information, how long to keep collected information and the like. In step 305, the financial institution system subsequently stores and verifies the collection parameters. For example, the financial institution system may verify that the network addresses for the information sources are correct and that any login/password data is valid. If the collection parameters are validated and verified, as determined in step 305, the financial institution system then proceeds to begin monitoring for information collection triggers. In some instances, the triggers comprise times (e.g., noon each day or Friday at 3 A.M. every week). In other instances, the triggers may include non-temporal events such as a network load being lower than a threshold load (e.g., harvesting information during instances of low network traffic and system load). Other triggers or combinations of triggers might also be implemented.

In step 315, the financial institution system determines whether a trigger has fired (e.g., a condition corresponding to the trigger has been satisfied) as part of the trigger monitoring process. If not, the financial institution system continues to wait and monitor for the occurrence of a trigger as described in step 310. If, however, the financial institution system determines that a trigger has fired, the system may initiate a connection with the information source or sources corresponding to the trigger in step 320 in accordance with the defined information collection specifications (e.g., security protocols, communication protocols, login information, and the like). Once the connection has been successfully established, the financial institution system may subsequently retrieve the requested personal information from the information source or sources in step 325 and store the retrieved information into an information archive in step 330. In some instances, storing the information into the archive may include storing the information in association with a financial account identifier (e.g., a checking or savings account number) of a financial account corresponding to the customer. The above process may be repeated for all information sources identified by the customer. This allows the customer to aggregate personal information (both financial and non-financial) in a single secure location for more convenient and efficient retrieval.

Figure 4:
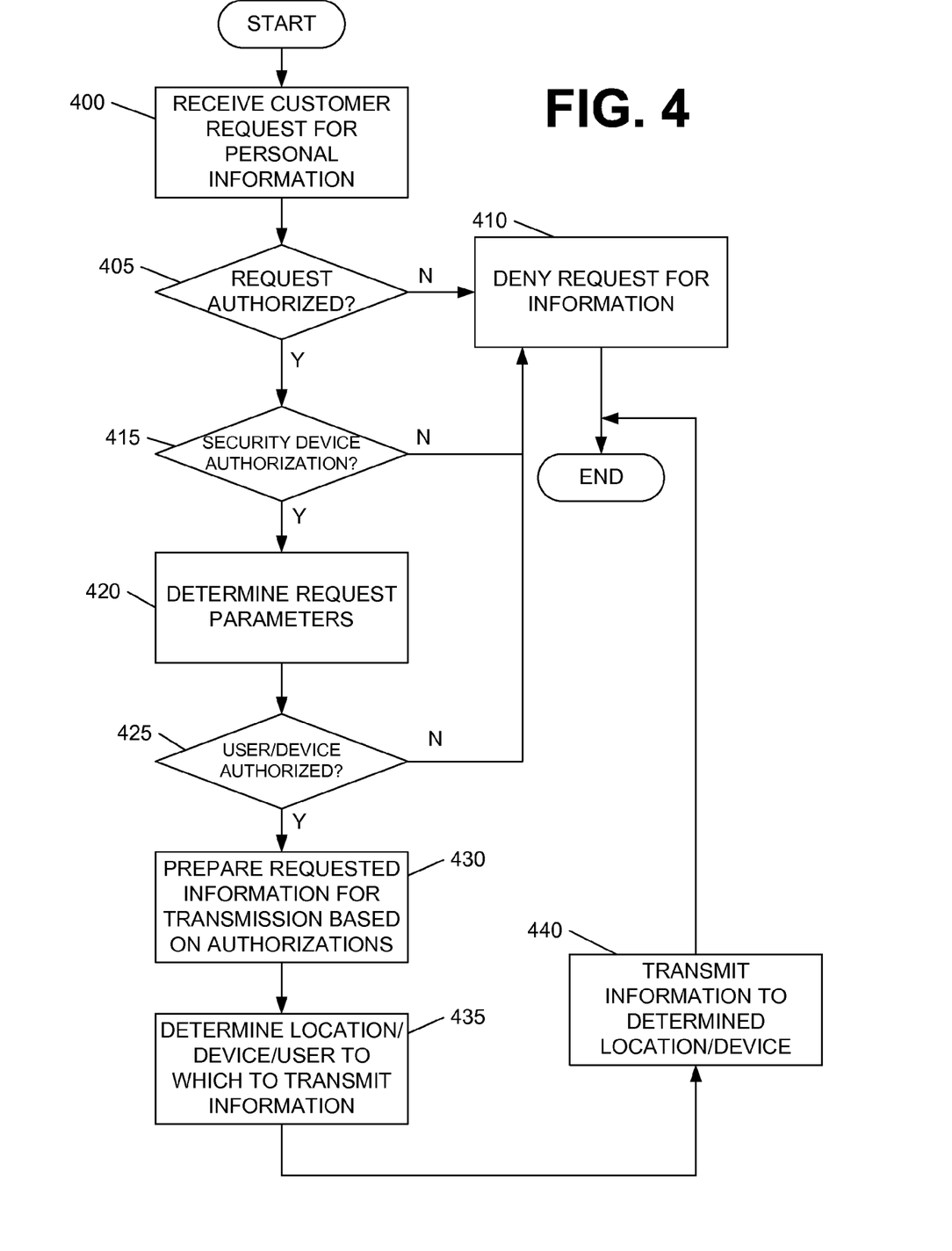
FIG. 4 is a flowchart illustrating a method by which a user requests personal information through a mobile device from a financial institution data storage archive according to one or more aspects described herein.

Once the data has been harvested, retrieval by customers is then made possible through the financial institution network. FIG. 4 illustrates a method by which a customer using a mobile or stationary communication device retrieves personal information from an information archive after the information archive has harvested the personal information from one or more information sources. The information retrieval process may begin by a financial institution system receiving a customer request for personal information from a remote device such as a PC, a PDA, a smartphone or other communication device, as illustrated in step 400. In response to the request, the financial institution system determines whether the request is authorized in step 405. Determining whether the request is authorized may include determining whether valid login credentials have been provided by the requesting user or device. The financial institution system may also determine whether the device is authorized by determining whether the requesting device is identified as an authorized device. If the financial institution system determines that the request is not authorized, the process will end with a transmission of a notification denying the request for information to the requesting device in step 410.

If the financial institution system determines that the request is authorized, the financial institution system, in one arrangement, is configured to determine whether a security device authorizes responding to the request in step 415. A security device may comprise a validating token or unit that provides another level of user verification. For example, the security device may include an RFID tag such as RFID tag 213 of FIG. 2. The security device may provide location verification (e.g., that the device is within a threshold proximity of the requesting device), code verification (e.g., displaying and/or generating a code that must be verified through the requesting device) and the like. In one configuration, location verification may be performed using GPS, zipcode information, triangulation (e.g., for cellular phones), network lookup (e.g., WHOIS) and the like. If the financial institution system determines that the security device does not authorize the response, the financial institution system may deny the request as in step 410.

If, on the other hand, the security device authorizes the response, the financial institution system may determine the parameters of the request in step 420 including identifying the type of information requested, time range for the information requested, desired format of the information requested, encryption desired and the like. For example, a customer may request the information be sent through text message or through email. Alternatively, the financial institution system may restrict transmissions to only secure data connections through financial institution specific applications running on the requesting device. Once the request parameters have been determined, the financial institution system may determine, in step 425, whether the requesting device or user is authorized to receive the requested information. For example, the customer may be requesting personal information for another individual. In such instances, the financial institution system may determine whether the requesting customer has sufficient privileges for accessing the requested personal information for the other individual. These determinations may involve permissions granted by the other individual, whether banking relationships exist between the two individuals (as known and/or recognized by the financial institution), whether there is a guardian or parent/child relationship and the like. In the banking relationship example, a financial institution may allow two individuals to access each other's personal information (or a subset of personal information which is flagged for sharing in such a manner) if those individuals have a linked checking or savings account. Linking two accounts may comprise the ability to transfer money between the accounts, deposit and/or withdraw funds from the accounts without the other's approval for each transaction, and the like.

In step 430, the requested information may be prepared for transmission in accordance with the determinations made in step 425. For example, if requested information is outside of a customer's privileges, the information might not be included in the transmission package prepared in response to the information request. In other examples, data may be formatted according to the requested format and encrypted using security protocols if such security was specified. In step 435, the financial institution system may determine a location, user and/or device to which the information is to be transmitted. The request received from the user may indicate a destination of the information. For example, the request may specify an e-mail address, fax number, postal address and the like to which the requested information is to be sent. Additionally or alternatively, the request may ask for a copy to be transmitted to the requesting device as well. In step 440, the system may subsequently transmit the prepared personal information to the determined recipient location, user and/or device.

The processes described above, e.g., with respect to FIGS. 3 and 4, may be used to retrieve personal information on-the-fly without having to carry physical documentation. Thus, in one example, a customer may retrieve medical insurance information when checking in for a medical appointment using his or her mobile telephone or other portable electronic device. In another example, by having access to minor children's personal information or other individual's personal information, an individual may access her husband's employment information when filling out tax forms. Alternatively or additionally, a user might not be required to carry a portable communication device. Instead, the user may access personal information through a communication device (e.g., personal computer) available at the location where the information is needed (e.g., a medical office, a tax preparation office, grocery store, retail store).

Figure 5:
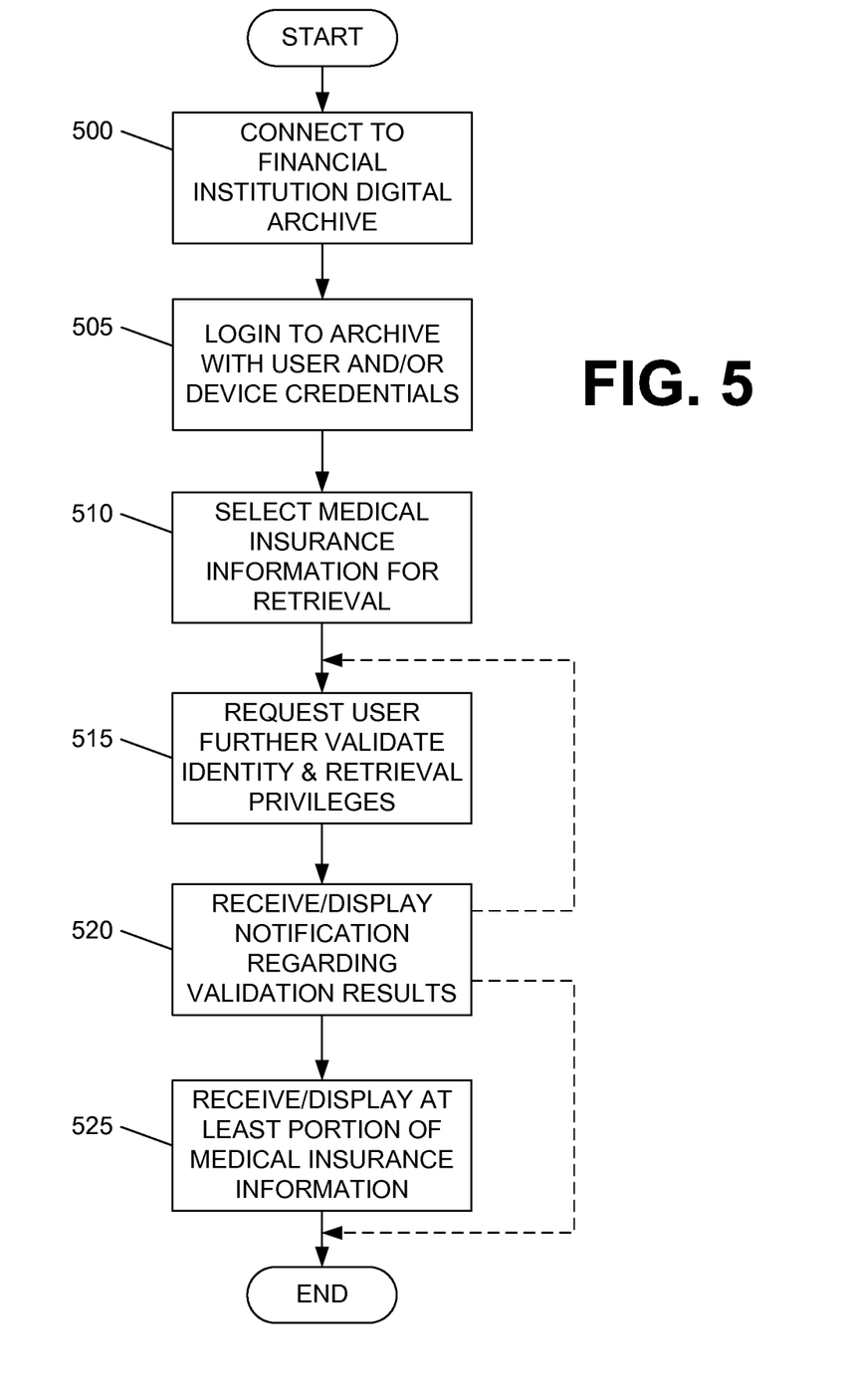
FIG. 5 is a flowchart illustrating a method by which a user retrieves medical insurance information from a data storage archive according to one or more aspects described herein.

The general principles and methodologies of FIG. 4, in one or more arrangements, may e applied to retrieval of specific information in various situations. FIG. 5, for example, illustrates a particular example method whereby a user retrieves medical insurance information using a mobile telecommunication device from a financial institution digital storage archive. The method of claim FIG. 5 may, for example, apply at least some of the processes described with respect to FIG. 4 in medical insurance information retrieval through a mobile device.

Referring to FIG. 5, the scenario may involve a user arriving for a medical appointment for his or her child. Upon arrival, the user may be requested to fill out medical information for the user's child including insurance data. The user may then operate his or her portable electronic device (e.g., a smartphone or PDA) and connect to the financial institution digital archive in step 500. For example, the user may launch a digital archive application specific to the financial institution or open a web browser and access a secure archive interface site through the web. In step 505, the user may login to the archive by entering personal identification information such as a login name, password, account personal identification number (PIN), social security number, address, phone number, and the like. Next, in step 510, the user may select the personal information that he or she wishes to retrieve. In this instance, the personal information may be medical insurance information for the user's child. In one example, the user may request an image of an insurance card for the user's child or for the user (e.g., the user's insurance policy applies to the child without the child's own insurance card).

Upon making the selection, the user may be asked to further validate his or her identity and retrieval privileges in step 515 using a security device separate from the device through which the information is being requested. In one example, the user may be asked to enter a code that is displayed and/or generated by the security device. In another example, the user may be asked to connect the security device to the user's phone or other communication device to verify the user's possession of the security device. In yet another example, the user may be asked to switch the security device on or to make it accessible to location determination systems such as GPS satellites so that the financial institution archive is able to detect the security device's location. Security may be validated by determining that the user's communication device (i.e., the device making the information request) is within a specified proximity (e.g., 100 yards, 50 feet, 1 mile) of the security device. In step 520, the user may be notified of whether his identity and retrieval privileges have been validated. If so, the requesting device may receive at least part of the requested personal information such as the child's medical insurance information in step 525. In some instances, and as discussed above, some personal information may be filtered out of the request response based on a scope of the user's privilege. For example, if the user requests personal information that he or she is not authorized to access, that requested information might not be included in the response.

If, on the other hand, the user's privileges and/or identity have not been validated, the process may end or validation restarted until the user is able to validate his or her identity and/or privileges using the security device.

In some instances, a user may request that accessed personal information be transmitted to a specified physical address, phone/fax number, e-mail address, web address and the like. For example, in the above medical insurance example, the user may request that the insurance card be faxed to the medical office so that the medical office has a copy of the insurance information without having to manually copy down all of the data. In another example, the user may request the digital archive to email the medical insurance information to the medical office.

According to one or more aspects, each financial account holder may be assigned a different security device. Accordingly, if one individual requests personal information for another user, the archive may validate the security device of the other user in addition or alternatively to the security device of the requesting user. This may be in addition to requiring that the requesting user is granted the appropriate privileges to access the requested personal information. For example, a husband and wife may each have their own unique security device and have linked financial accounts. If the wife wishes to access the personal information of the husband, the digital storage archive may require that the information request be validated by the husband's security device.

Figure 6:
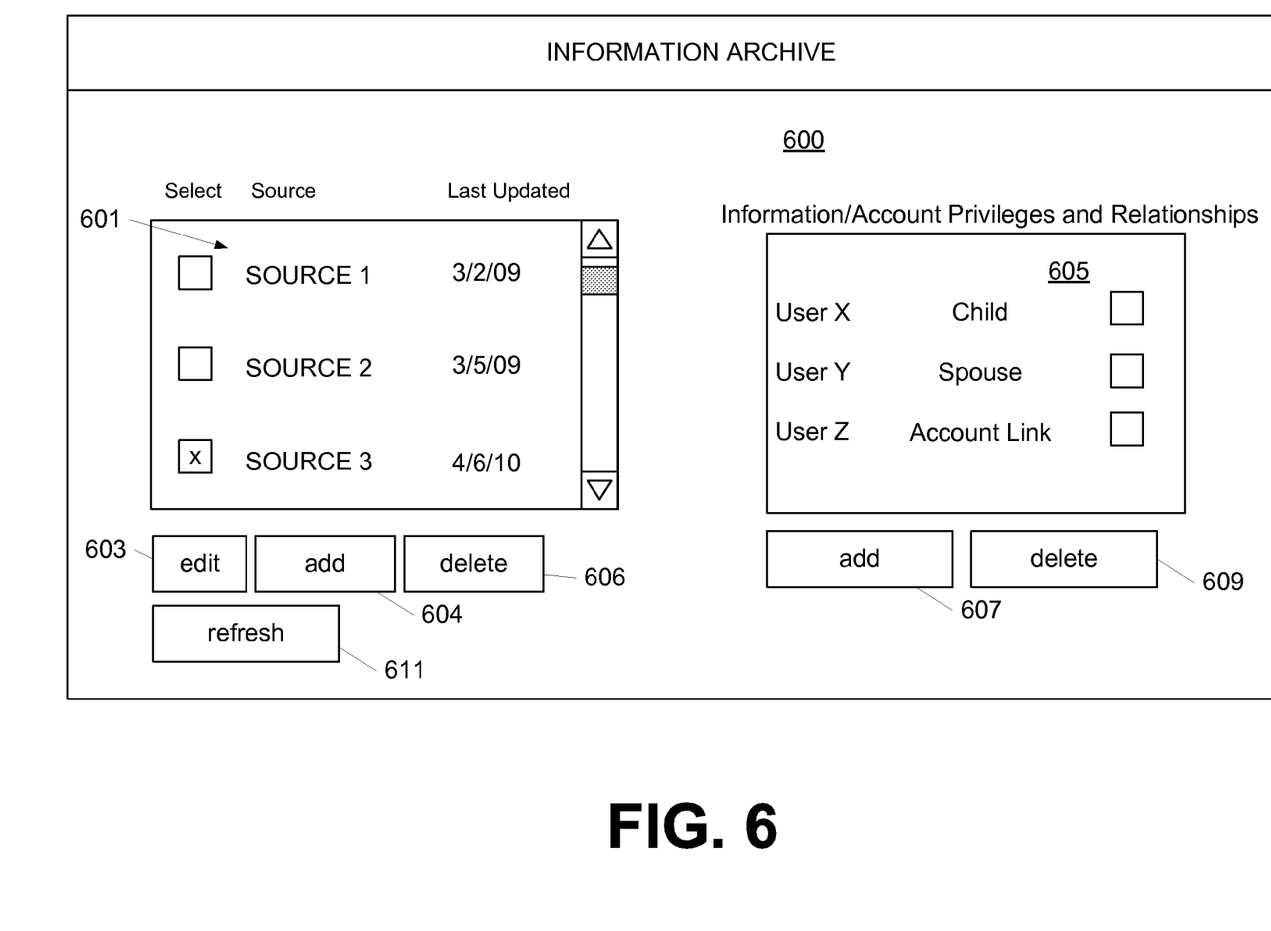
FIG. 6 illustrates an example data access interface according to one or more aspects described herein.

FIG. 6 illustrates an example user interface through which a user may access and retrieve various personal information through a financial institution storage archive in which financial and non-financial personal information may be stored according to a user's financial account number. Interface 600 includes a list 601 of all information sources that have been registered by the user. Adjacent to the information source identifier (e.g., a web address, a name, a server address, a physical address, a phone number), the list 601 displays the last time information from the information source was updated. Each of the information sources in list 601 is selectable. By selecting of the information sources in list 601, a user may view the various personal information collected from those sources. An edit option 603 is displayed in conjunction with each of the information sources in list 601 to allow a user to modify information collection parameters for that information source. For example, a user may choose to delete an information source by editing the collection parameters (e.g., clearing all parameters). Alternatively or additionally, add option 604 and delete option 606 may be used to add and delete information sources.

Interface 600 further displays financial and personal relationships that affect the personal information that may be accessed in other personal information region 605. For example, other personal information region 605 may display other users for which personal information is accessible. Each of the other users listed in region 605 also displays the relationship with the other user such as parent/guardian or linked checking accounts and the like. A user may choose to add additional relationships or information access privileges using option 607 and may delete relationships or privileges using delete option 609. Additionally, interface 600 includes a manual refresh option 611 that allows a user to manually initiate information collection/refreshing. In one or more arrangements, only those sources that are checked or selected may be refreshed upon selection of option 611.

Storing a wide variety of personal information at a financial institution data storage archive may provide a user with feelings of added security given the secure nature of financial data and transactions. Such storage also affords users a convenient route to access multiple types of disparate personal information (including non-financial data) since financial information is frequently accessed and used in the ordinary course of business and life.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

The invention claimed is:

1. A method comprising:
    electronically receiving, by a digital storage archive, personal information associated with an individual from a plurality of information sources including a first information source and a second information source different from the first information source;
    determining, by the digital storage archive, a financial account identifier corresponding to a financial account of the individual at a financial institution;
    storing, by the digital storage archive, the personal information at the financial institution; and
    associating, by the digital storage archive, the personal information with the determined financial account identifier such that the personal information can be identified by the determined financial account identifier, wherein the personal information includes at least one piece of non-financial personal information.

2. The method of claim 1, wherein electronically receiving the personal information includes periodically retrieving personal information from the plurality of information sources.

3. The method of claim 1, further comprising:
    receiving, by the digital storage archive, a request for the at least one piece of non-financial personal information from a remote device;
    determining, by the digital storage archive, whether the remote device is authorized to receive the at least one piece of non-financial personal information; and
    in response to determining that the remote device is authorized to receive the at least one piece of non-financial personal information, transmitting, by the digital storage archive, the at least one piece of non-financial personal information to the remote device.

4. The method of claim 3, wherein determining whether the remote device is authorized to receive the at least one piece of non-financial personal information includes:
    determining whether an identifier associated with the remote device is stored in association with the financial account of the individual.

5. The method of claim 3, wherein determining, by the digital storage archive, whether the remote device is authorized to receive the at least one piece of non-financial personal information includes:
    determining, by the digital storage archive, whether a validation device different from the remote device is within a specified distance from the remote device.

6. The method of claim 1, wherein the at least one piece of non-financial personal information includes medical insurance information.

7. The method of claim 1, wherein the at least one piece of non-financial personal information includes receipt information for at least one of: products and services purchased.

8. The method of claim 1, wherein the personal information comprises an image of documentation associated with at least one of the plurality information sources.

9. An apparatus comprising:
a processor; and
memory operatively coupled to the processor and storing computer readable instructions that, when executed, cause the apparatus to:
electronically receive personal information associated with a first individual from a plurality of information sources including a first information source and a second information source different from the first information source;
determine a financial account identifier corresponding to a financial account of the first individual at a financial institution;
store the personal information at the financial institution; and
associate the personal information with the determined financial account identifier such that the personal information can be identified by the determined financial account identifier, wherein the personal information includes at least one piece of non-financial personal information.

10. The apparatus of claim 9, wherein the computer readable instructions, when executed, further cause the apparatus to:
receive a request for the at least one piece of non-financial personal information from a remote device;
determine whether the remote device is authorized to receive the at least one piece of non-financial personal information; and
in response to determining that the remote device is authorized to receive the at least one piece of non-financial personal information, transmit the at least one piece of non-financial personal information to the remote device.

11. The apparatus of claim 10, wherein determining whether the remote device is authorized to receive the at least one piece of non-financial personal information includes:
determining whether an identifier associated with the remote device is stored in association with the financial account of the individual.

12. The apparatus of claim 10, wherein determining whether the remote device is authorized to receive the at least one piece of non-financial personal information includes:
determining whether a validation device different from the remote device is within a specified distance from the remote device.

13. The apparatus of claim 10, wherein the request for the at least one piece of non-financial personal information is received from a second individual, and
wherein determining whether the remote device is authorized to receive the at least one piece of non-financial personal information includes determining whether a validation device corresponding to the first individual and is within a specified distance from the remote device.

14. The apparatus of claim 9, wherein the computer readable instructions, when executed, further cause the apparatus to:
determine that the financial account of the first individual is financially linked to a financial account of a second individual; and
in response, allow the second individual to access the personal information.

15. The digital storage archive of claim 9, wherein the personal information comprises an image of documentation associated with at least one of the plurality of information sources.

16. One or more tangible non-transitory computer readable media storing computer readable instructions that, when executed, cause a data storage device to:
electronically receive personal information associated with a first individual from a plurality of information sources including a first information source and a second information source different from the first information source;
determine a financial account identifier corresponding to a financial account of the first individual at a financial institution;
store the personal information at the financial institution; and
associate the personal information with the determined financial account identifier such that the personal information can be identified by the determined financial account identifier, wherein the personal information includes at least one piece of non-financial personal information.

17. The one or more computer readable media of claim 16, wherein the computer readable instructions, when executed, further cause the data storage device to:
receive a request for the at least one piece of non-financial personal information from a remote device;
determine whether the remote device is authorized to receive the at least one piece of non-financial personal information; and
in response to determining that the remote device is authorized to receive the at least one piece of non-financial personal information, transmit the at least one piece of non-financial personal information to the remote device.

18. The one or more computer readable media of claim 17 wherein determining whether the remote device is authorized to receive the at least one piece of non-financial personal information includes:
determining whether a validation device different from the remote device is within a specified distance from the remote device.

19. The one or more computer readable media of claim 17, wherein the request for the at least one piece of non-financial personal information is received from a second individual, and
wherein determining whether the remote device is authorized to receive the at least one piece of non-financial personal information includes determining whether a validation device corresponding to the first individual and is within a specified distance from the remote device.

20. The one or more computer readable media of claim 16, wherein the at least one piece of non-financial personal information includes receipt information for at least one of: products and services purchased.

* * * * *